(12) United States Patent
Eck et al.

(10) Patent No.: US 11,143,285 B2
(45) Date of Patent: Oct. 12, 2021

(54) LAUNCH ASSIST MECHANISM FOR A CONTINUOUSLY VARIABLE TRANSMISSION

(71) Applicant: TEAM Industries, Inc., Bagley, MN (US)

(72) Inventors: Brian George Eck, Bagley, MN (US); Brandon R. Bonham, Bagley, MN (US)

(73) Assignee: TEAM Industries, Inc., Bagley, MN (US)

( * ) Notice: Subject to any disclaimer, the term of this patent is extended or adjusted under 35 U.S.C. 154(b) by 421 days.

(21) Appl. No.: 16/057,404

(22) Filed: Aug. 7, 2018

(65) Prior Publication Data

US 2019/0040942 A1 Feb. 7, 2019

Related U.S. Application Data

(60) Provisional application No. 62/542,005, filed on Aug. 7, 2017.

(51) Int. Cl.
*F16H 55/56* (2006.01)
*F16H 61/662* (2006.01)
(Continued)

(52) U.S. Cl.
CPC .......... *F16H 55/563* (2013.01); *B60W 10/02* (2013.01); *B60W 10/107* (2013.01);
(Continued)

(58) Field of Classification Search
CPC ............. F16H 55/563; F16H 61/66245; F16H 63/067; F16H 9/12; F16H 55/56
(Continued)

(56) References Cited

U.S. PATENT DOCUMENTS 3,362,242 A * 1/1968 Watkins ................ F16H 55/563
474/15
3,698,256 A * 10/1972 Albertson ............. F16H 55/563
474/12
(Continued)

FOREIGN PATENT DOCUMENTS

EP 2503197 A2 9/2012
JP 2006170387 A 6/2006

OTHER PUBLICATIONS

International Searching Authority, "International Search Report and Written Opinion from PCT Application No. PCT/US2018/045610 dated Oct. 4, 2018", "from Foreign Counterpart to U.S. Appl. No. 16/057,404", filed Oct. 4, 2018, pp. 1-18, Published in: WO.
(Continued)

*Primary Examiner* — Henry Y Liu
(74) *Attorney, Agent, or Firm* — Fogg & Powers LLC

(57) ABSTRACT

A primary clutch of a continuously variable transmission with a launch mechanism is provided. The primary clutch includes a central post, a fixed sheave assembly, a movable sheave assembly and a locking mechanism. The central post is configured to receive rotational torque from a motor. The fixed sheave assembly is statically mounted on the central post. The movable sheave assembly is mounted on the central post. The movable sheave assembly includes a movable sheave system that is configured to move axially on the central post towards the fixed sheave assembly as RPM of the primary clutch increase. The locking mechanism is configured and arranged to selectively prevent movement of the movable sheave system independent of the RPM of the primary clutch.

17 Claims, 12 Drawing Sheets

(51) Int. Cl.
*F16H 9/18* (2006.01)
*B60W 30/18* (2012.01)
*B60W 10/107* (2012.01)
*F16H 63/34* (2006.01)
*F16H 9/14* (2006.01)
*B60W 10/02* (2006.01)
*F16H 9/12* (2006.01)
*F16D 43/06* (2006.01)
*F16H 59/24* (2006.01)

(52) U.S. Cl.
CPC ....... *B60W 30/18027* (2013.01); *F16D 43/06* (2013.01); *F16H 9/125* (2013.01); *F16H 9/14* (2013.01); *F16H 9/18* (2013.01); *F16H 61/662* (2013.01); *F16H 61/66236* (2013.01); *F16H 61/66272* (2013.01); *F16H 63/34* (2013.01); *B60W 2300/36* (2013.01); *F16H 59/24* (2013.01); *F16H 2061/66213* (2013.01); *F16H 2061/66295* (2013.01); *F16H 2312/02* (2013.01)

(58) Field of Classification Search
USPC .............................................. 474/13, 14, 15
See application file for complete search history.

(56) References Cited

U.S. PATENT DOCUMENTS

| | | | | |
|---|---|---|---|---|
| 3,709,052 A * | 1/1973 | Lassanske | F16H 55/563 | 474/13 |
| 3,727,478 A * | 4/1973 | Erickson | F16H 55/563 | 474/14 |
| 3,939,720 A * | 2/1976 | Aaen | F16H 55/563 | 474/14 |
| 3,958,461 A * | 5/1976 | Aaen | F16H 55/563 | 474/14 |
| 3,986,406 A * | 10/1976 | Prasad | F16H 61/66245 | 474/14 |
| 4,364,735 A * | 12/1982 | Plamper | F16H 55/563 | 474/13 |
| 5,460,575 A * | 10/1995 | Berto | F16H 55/563 | 474/11 |
| 5,795,255 A * | 8/1998 | Hooper | F16H 61/66245 | 474/14 |
| 6,334,826 B1 * | 1/2002 | Takagi | F16H 55/563 | 474/12 |
| 6,811,504 B2 * | 11/2004 | Korenjak | F01B 1/12 | 474/13 |
| 7,240,758 B2 * | 7/2007 | Korenjak | F16H 55/56 | 180/292 |
| 7,726,927 B2 * | 6/2010 | Cook | F16B 35/005 | 411/398 |
| 8,175,785 B2 * | 5/2012 | Turski | B60W 50/082 | 701/82 |
| 9,518,641 B2 * | 12/2016 | Mariotti | F16H 61/66245 | |
| 10,858,005 B2 * | 12/2020 | Wishin | B60W 10/02 | |
| 10,865,860 B2 * | 12/2020 | Mariotti | F16H 55/563 | |
| 10,882,524 B2 * | 1/2021 | Cunningham | B60W 10/18 | |
| 2002/0119846 A1 * | 8/2002 | Kitai | F16H 55/56 | 474/14 |
| 2006/0264279 A1 * | 11/2006 | Starkey | F16H 63/062 | 474/18 |
| 2010/0161188 A1 * | 6/2010 | Turski | B60W 30/18027 | 701/67 |
| 2013/0157794 A1 * | 6/2013 | Stegelmann | F16H 9/18 | 474/8 |
| 2014/0315670 A1 * | 10/2014 | Mariotti | F16H 9/12 | 474/12 |
| 2014/0349792 A1 * | 11/2014 | Aitcin | F16H 63/067 | 474/13 |
| 2015/0011344 A1 * | 1/2015 | Ebihara | F16H 63/062 | 474/8 |
| 2015/0094176 A1 * | 4/2015 | Kakemizu | F16H 63/062 | 474/8 |
| 2015/0111674 A1 * | 4/2015 | Yuan | F16H 9/12 | 474/14 |
| 2015/0134213 A1 * | 5/2015 | Matsubara | B60W 10/06 | 701/54 |
| 2018/0345973 A1 * | 12/2018 | Krueger | B60W 10/06 | |
| 2018/0355966 A1 * | 12/2018 | Mariotti | F16H 9/18 | |

OTHER PUBLICATIONS

International Bureau, "International Preliminary Report on Patentability from PCT Application No. PCT/US2018/045610", from Foreign Counterpart to U.S. Appl. No. 16/057,404, filed Feb. 20, 2020, pp. 1-12, Published: WO.

* cited by examiner

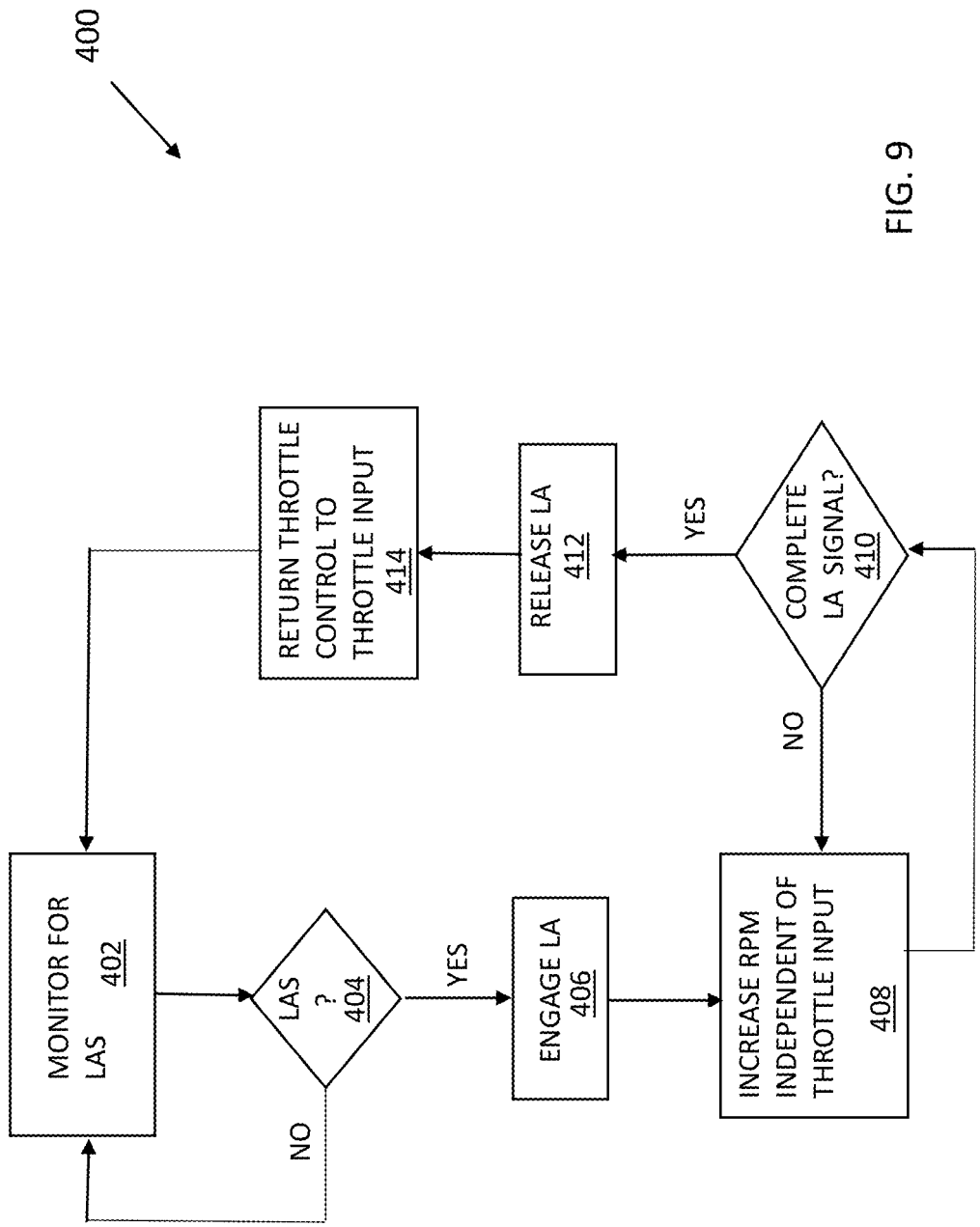

LAUNCH ASSIST MECHANISM FOR A CONTINUOUSLY VARIABLE TRANSMISSION

CROSS-REFERENCE TO RELATED APPLICATIONS

This Application claims priority to U.S. Provisional Application Ser. No. 62/542,005, entitled "Launch Assist Mechanism for a CVT," filed on Aug. 7, 2017, which is incorporated in its entirety herein by reference.

BACKGROUND

In a Continuously Variable Transmission (CVT) a belt transfers rotational torque from a drive clutch (primary clutch) to a driven clutch (secondary clutch). The primary clutch is typically in rotational communication with a crankshaft of an engine. The secondary clutch provides torque to at least a drive train of a vehicle. As the engine's revolutions per minute (RPMs) increase, a movable sheave that makes up part of the primary clutch moves towards a fixed sheave of the primary clutch pinching the belt to transfer rotational torque to the secondary clutch. Moreover, as the moveable sheave comes closer still to the fixed sheave, the belt moves away from a rotational axis of the primary clutch. This movement of the belt away from the rotational axis at least in part changes the gear ratio of the CVT. Hence a consistent RPM launch profile is provided in a typical CVT that is based at least in part on the RPM of the primary clutch and the operating characteristics of flyweights and a main biasing member.

SUMMARY

The present invention will be understood by reading and studying the following specification. The following summary is made by way of example and not by way of limitation. It is merely provided to aid the reader in understanding some of the aspects of the subject matter described. Embodiments provides a launch assist mechanism for a CVT that allows a vehicle operator to selectively override when a primary clutch engages (pinches) the belt to launch the vehicle at a desired RPM.

In one example embodiment, a primary clutch of a continuously variable transmission with a launch assist mechanism is provided. The primary clutch includes a central post, a fixed sheave assembly, a movable sheave assembly and a locking mechanism. The central post is configured to receive rotational torque from a motor. The fixed sheave assembly is statically mounted on the central post. The movable sheave assembly is mounted on the central post. The movable sheave assembly includes a movable sheave system that is configured to move axially on the central post towards the fixed sheave assembly as RPM of the primary clutch increase. The locking mechanism is configured and arranged to selectively prevent movement of the movable sheave system independent of the RPM of the primary clutch.

In another example, another primary clutch of a continuously variable transmission with a launch assist mechanism provided. The primary clutch includes a central post, a fixed sheave assembly and a movable sheave assembly. The central post is configured to receive rotational torque from a motor. The fixed sheave assembly is statically mounted on the central post. The movable sheave assembly is mounted on the central post. The movable sheave assembly includes a spider, a movable base, a primary clutch cover, a main biasing member and at least one flyweight. The spider is statically mounted to the central post. The primary clutch cover is coupled to the movable base. The main biasing member is positioned to assert a main biasing force to distance the primary clutch cover from the spider. Moreover, the least one flyweight forms a flyweight-main biasing member configuration to selectively move at least portion of the movable sheave assembly axially on the central post. The at least one flyweight pivotally coupled to the movable base. The at least one flyweight configured and arranged to engage the spider as RPM of the primary clutch increases to assert a force that counters the main biasing force of the main biasing member to move the primary clutch cover and movable base axially towards the fixed sheave assembly along the central post. Further a locking mechanism is included that is configured and arranged to selectively prevent movement of the primary clutch cover and movable base independent of the flyweight-main biasing member configuration.

In yet another example, a vehicle with a launch assist mechanism is provided. The vehicle includes an engine to generate torque, a continuously variable transmission and drive train. The continuously variable transmission includes a primary clutch and a secondary clutch. The secondary clutch is rotationally coupled to the primary clutch via endless looped belt. The primary clutch includes a central post, a fixed sheave assembly, a movable sheave assembly and a locking mechanism. The central post is configured to receive rotational torque from the motor. The fixed sheave assembly is statically mounted on the central post. The movable sheave assembly is mounted on the central post. The movable sheave assembly includes a movable sheave system that is configured to move axially on the central post towards the fixed sheave assembly as RPM of the primary clutch increases. The locking mechanism is configured and arranged to selectively prevent movement of the movable sheave system independent of RPM of the primary clutch. The drive train is coupled to the secondary clutch.

In still further an embodiment, a method of operating a continuously variable transmission (CVT) with a launch assist mechanism is provided. The method includes receiving a launch assist signal; engaging a locking mechanism configured and arranged to selectively prevent movement of a movable sheave system independent of an RPM of a primary clutch of the CVT; increasing the RPM of the primary clutch independent of an operator throttle control; and upon receiving a complete launch assist signal, releasing the locking mechanism and returning throttle control to the operator.

BRIEF DESCRIPTION OF THE DRAWINGS

The present invention can be more easily understood and further advantages and uses thereof will be more readily apparent, when considered in view of the detailed description and the following figures in which:

FIG. 9 illustrates a throttle control flow diagram according to one exemplary embodiment.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a launch assist mechanism for a CVT that allows of the operator to selectively determine when the drive clutch engages the belt independent to the revolutions per minute (RPM) of the engine. In particular, in embodiments, the operator of a vehicle has the ability to have a higher engagement RPM on a CVT system above the original stock engagement RPM when so desired. This can be applied to any vehicle with a CVT system such as, but not limited to, an ATV, UTV, snowmobile, motor vehicle to name a few. During normal usage, the vehicle will maintain the original stock engagement RPM. In embodiments, the operator may choose to temporarily override the original stock engagement in place of a higher engagement RPM. An example where a higher engagement RPM may be beneficial is during high performance situations when aggressive acceleration is desired. In an example embodiment, a momentary switch is mounted on the steering wheel or handle bars of the vehicle. In other embodiments, the momentary switch is positioned in other locations the operator can reach during operation of the vehicle. Further in embodiments, when the switch is depressed and held, a solenoid or electric actuator mounted to the outer CVT enclosure applies a side force to the end of the primary clutch creating a mechanical lock between the primary clutch cover and a primary clutch post. This allows the engine to increase in RPM without clutch engagement occurring. Once the desired engagement RPM is achieved, the button is released. When the button is released, the side force is removed and the clutch is allowed to unlock and engage the belt, thus propelling the vehicle forward with great thrust. Embodiments alleviate negative performance effects of the original stock engagement RPM while still allowing it to remain intact as it is vital for slow speed vehicle operation and maneuvering. Moreover embodiments still allows for easy servicing and maintenance of the CVT system as well.

Figure 1:
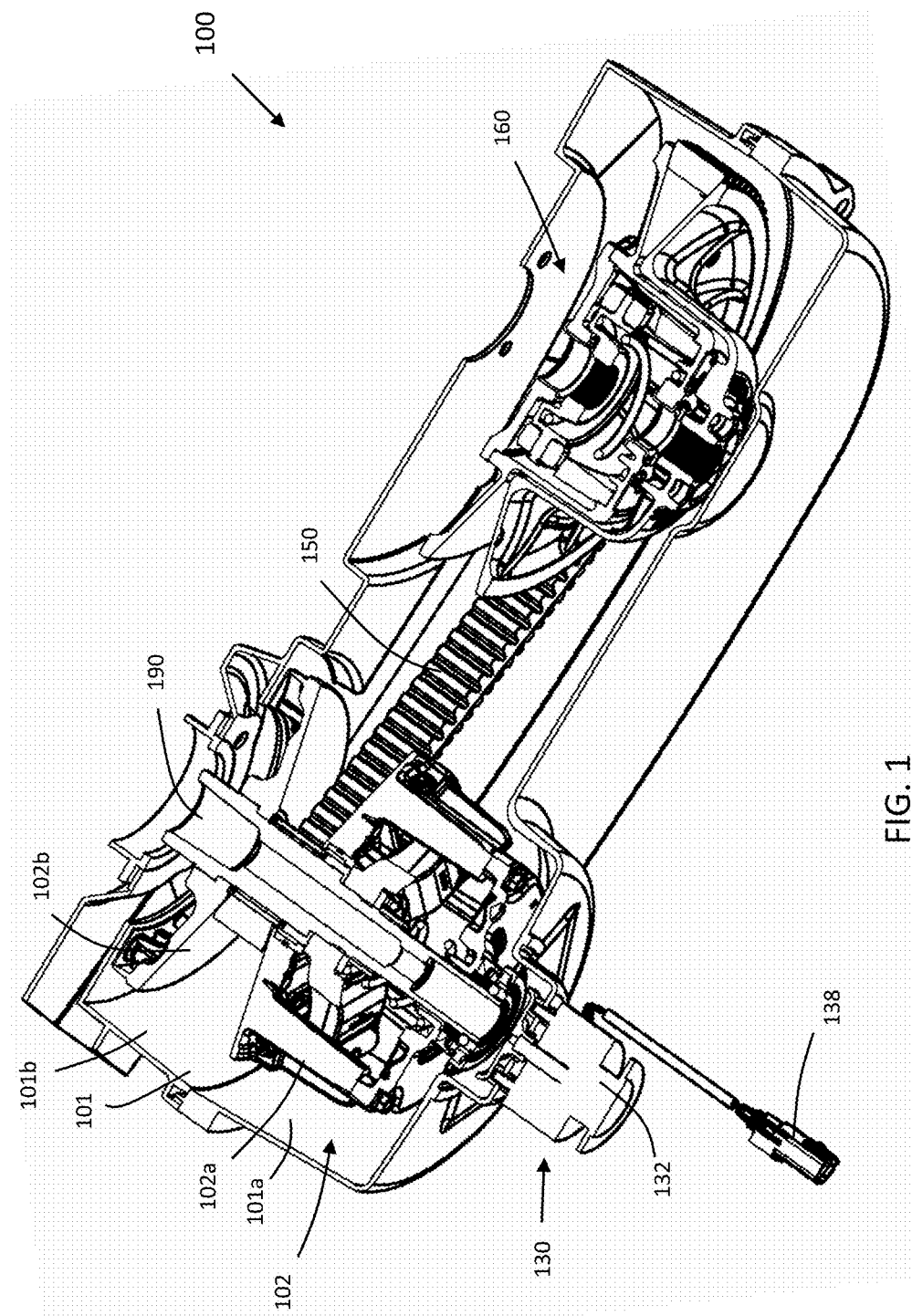
FIG. 1 illustrates a cross-sectional top perspective view of a CVT with launch assist according to one exemplary embodiment.

Referring to FIG. 1, a cross-sectional top perspective view of a CVT with launch assist 100 is illustrated. The CVT with launch assist 100 includes housing 101 that houses a primary clutch 102 and a secondary clutch 160. A belt 150 conveys rotation of the primary clutch 102 to the secondary clutch 160. The housing 101 in this embodiment includes a first housing section 101a and a second housing section 101b that are selectively coupled together. The primary clutch 102 is mounted on a central post 190. The central post 190 is rotationally coupled to a crankshaft of an engine (not shown). The primary clutch 102 includes a movable sheave assembly 102a and a fixed sheave assembly 102b. Also illustrated in FIG. 1, is an actuator 130, The actuator 130 in this example embodiment is an electrically actuated actuator 130 including a signal connection port 138 that would be in communication with a switch (not shown) as discussed above.

Figure 2:
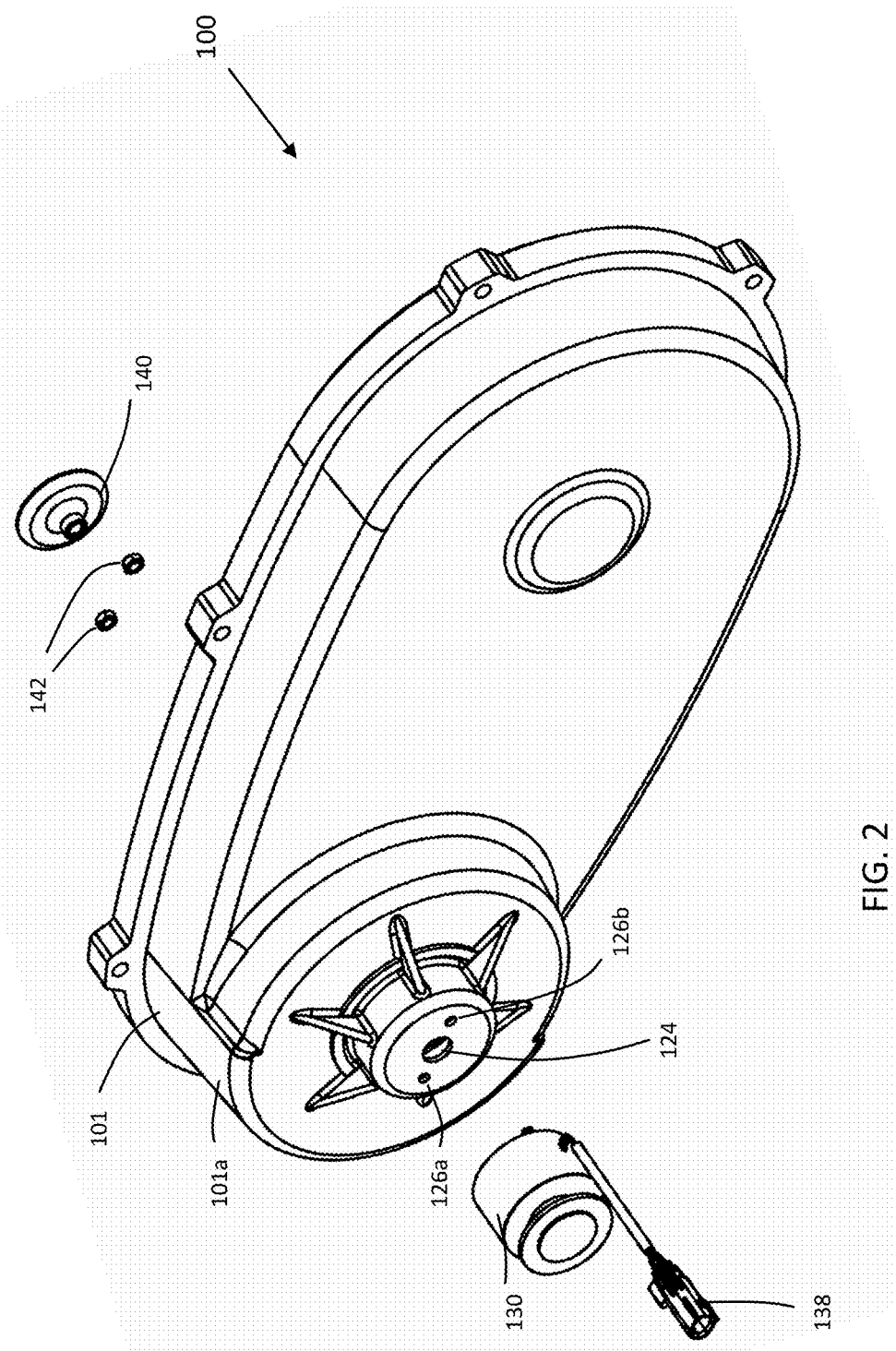
FIG. 2 illustrates a side perspective of a first housing section of a housing and an actuator according to one exemplary embodiment.

FIG. 2 illustrates the first housing section 101a of the housing 101 and the actuator 130. The first housing section 101a of the housing 101 includes a pair of spaced actuator connection passages 126a and 126b upon which threaded attaching posts 136a and 136b (best seen in FIG. 4) of an actuator body 132 of the actuator 130 pass through. The threaded attaching posts are secured to the first housing section 101a via securing nuts 142. The first housing section 101a also includes an activation passage 124 as illustrated in FIG. 2. An activation rod 134 (best seen in FIG. 4) of the actuator 130 passes through the activation passage 124 of the first housing section 101a. Also illustrated in FIG. 2 is a push cup 140 which is acted upon via the activation rod 134 as further discussed in detail below.

Figure 3A:
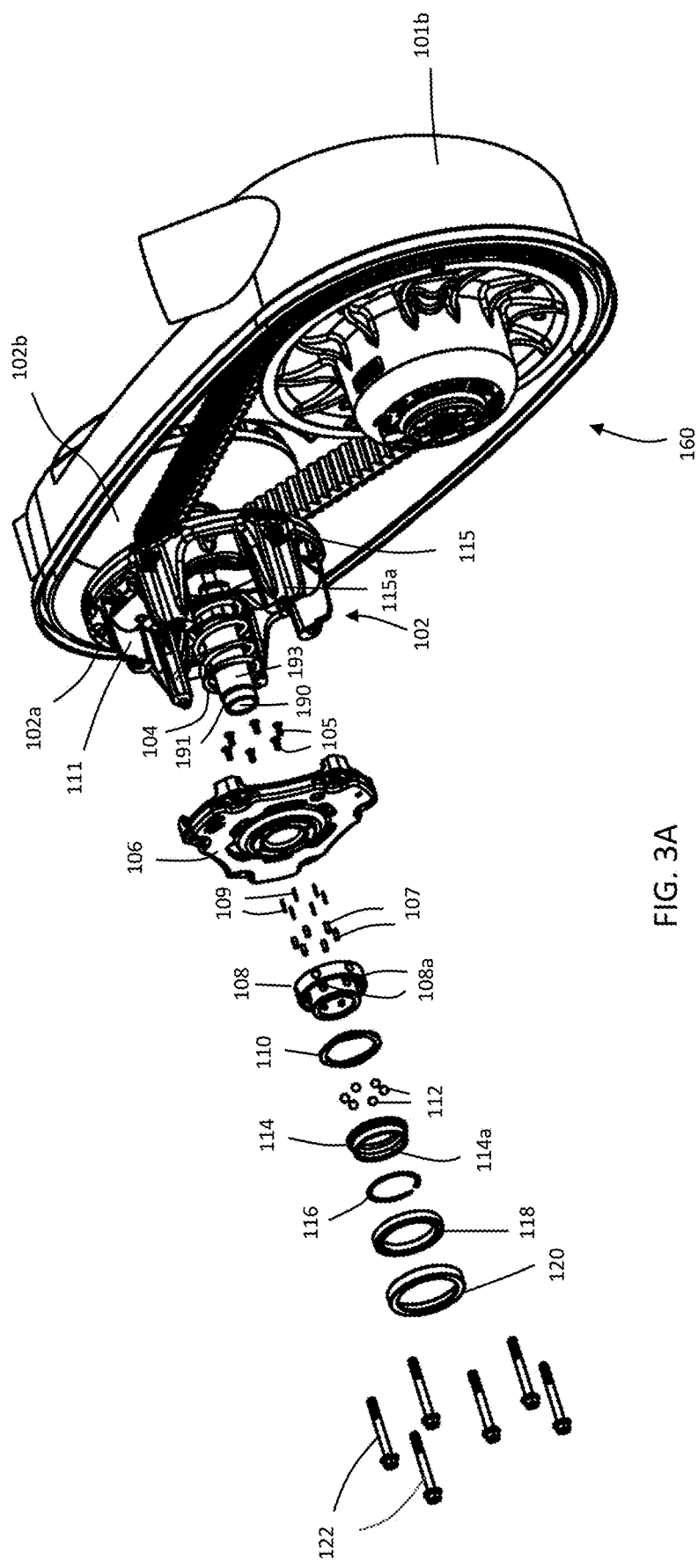
FIG. 3A illustrates a partial exploded side view of a movable sheave assembly of a primary clutch according to one exemplary embodiment.

FIG. 3A illustrates a partial exploded view of the movable sheave assembly 102a. The movable sheave assembly 102a includes a main biasing member 104 which is a spring in an embodiment that is received around the central post 190. The movable sheave assembly 102a also includes a primary clutch cover 106, a spider 111 and flyweights 113 (best seen in FIG. 4B). The main biasing member 104 is positioned between the primary clutch cover 106 and the spider 111 to bias the primary clutch cover 106 a select distance from the spider 111. The primary clutch cover 106 is connected to towers 115a of a movable base 115 of the movable sheave assembly 102a that form part of a movable sheave system. The flyweights 113 are pivotally coupled to a movable base 115. As the primary clutch 102 rotates, a centrifugal force causes the flyweights 113 to pivot out asserting a force on the spider 111. As the centrifugal force increases, the force by the flyweights 113 on the spider 111 increases therein countering a biasing force of the main biasing member 104. Since, the spider 111 is axially locked to the central post 190, the flyweights 113 axially move the movable base 115 along an axis of the central post 190 towards the fixed sheave assembly 102b. This flyweight-main biasing member configuration moves the movable sheave system of the movable sheave assembly 102a axially on the center post 190 based on the RPM of the movable sheave assembly 102a. Other configurations that selectively move the movable sheave assembly 102a on the center post 190 based on the RPM of the moveable sheave assembly 102a may be used in other embodiments.

Referring back to FIG. 3A, the movable sheave assembly 102a in the embodiment shown, further includes a lock collar 108 that is fastened to the primary clutch cover 106 via fasteners 105. The lock collar 108 includes ball pockets 108a which receives locking balls 112. In one embodiment, the passages through the lock collar 108 that form the ball pockets are not perpendicular to the rotational axis of the primary clutch 102 to aid in operations of the locking balls, lock collar 108 and slide collar 114 as discussed below. The lock collar 108 in an embodiment further includes a plurality of detent passages 108b (best illustrated in FIG. 5B) that each receive a detent bullet 107 and associated compression spring 109. The detent bullet-compression spring arrangements provide a retaining force on the locking balls 112 to prevent them from becoming dislodged from their associated ball pockets 108a under centrifugal force. The lock collar 108 is received around the central post 190 as best illustrated in FIG. 4B. The central post 190 has a first post portion 191 that has a first outer diameter and second post portion 193 that has a second outer diameter. The second outer diameter is larger than the first outer diameter of the first post portion 191. A ramped step 191a transitions between the first post portion 191 and the second post portion 193. This is best illustrated in FIG. 5A.

Figure 5A:
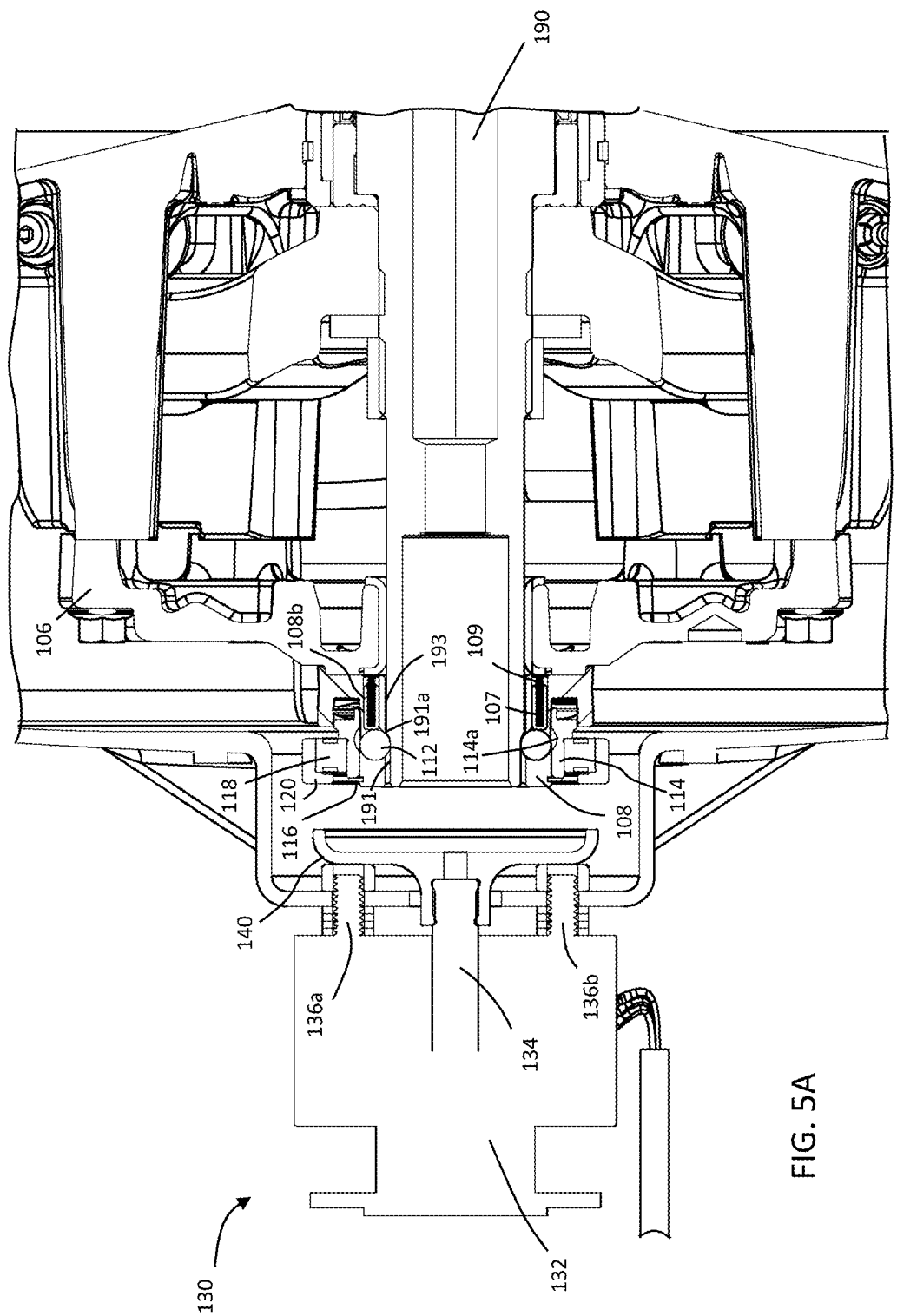
FIG. 5A illustrates a cross-sectional side perspective view of the primary clutch and actuator with a launch assist disabled and the primary clutch at idle according to one exemplary embodiment.
Figure 5B:
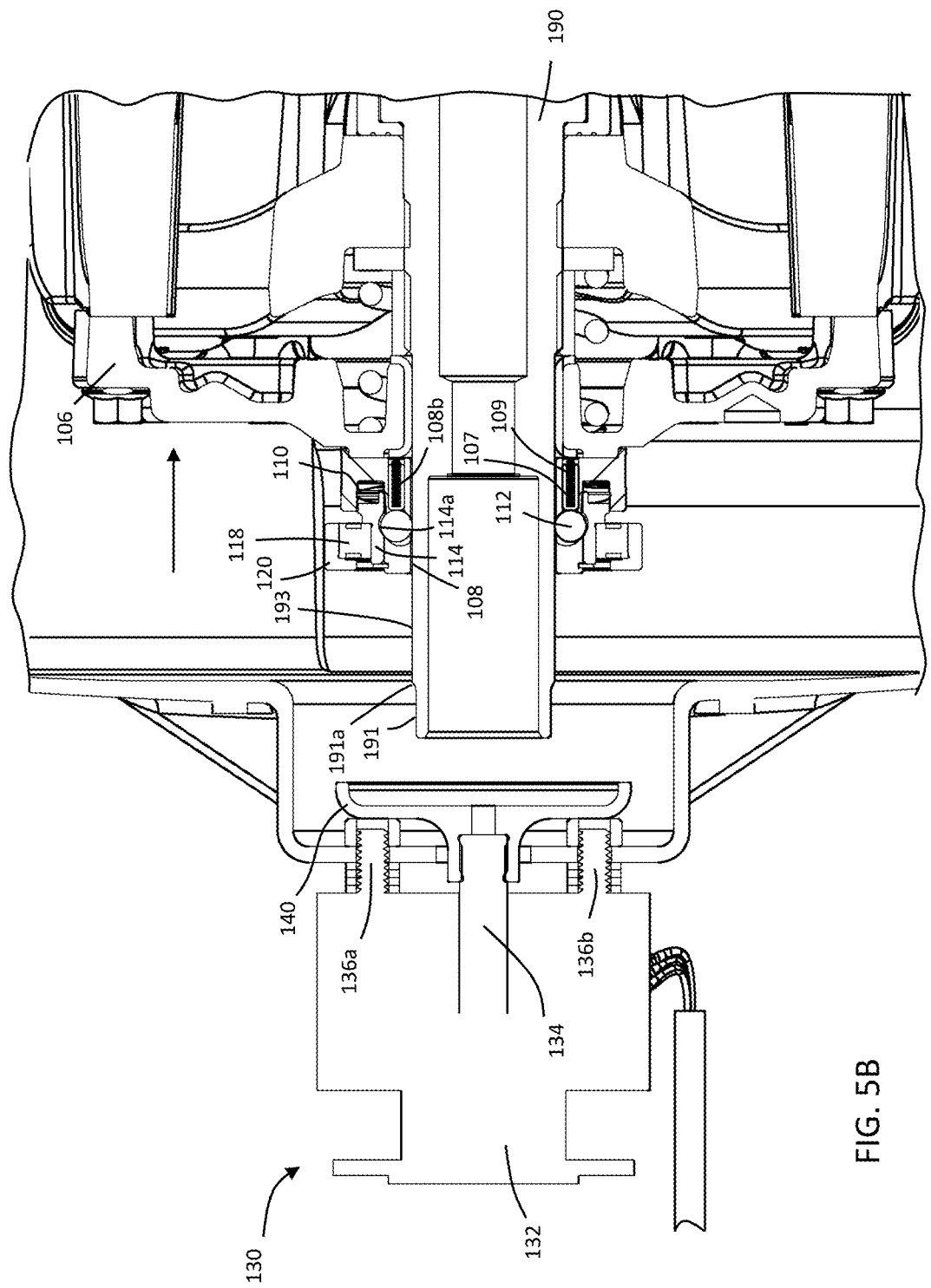
FIG. 5B illustrates a cross-sectional side perspective view of the primary clutch and actuator with a launch assist disabled and the primary clutch rotating at a revolutions per minute that moved the movable sheave assembly towards the fixed sheave assembly according to one exemplary embodiment.

The movable sheave assembly 102a further includes the slide collar 114 with an inner ball retaining groove 114a. The slide collar 114 is slidably positioned over a portion of the lock collar 108 such that a portion of the locking balls 112 may be received within the inner ball retaining groove 114a of the slide collar 114. A return biasing member 110, which is a wave spring in one embodiment, is positioned between a portion of the lock collar 108 and the slide collar 114 to assert a bias force that positions the inner ball retaining groove 114a of the slide collar 114 to receive a portion of locking balls 112 under normal operations as discussed below. This is best illustrated in FIG. 5B.

A retaining clip 116 received in a retaining groove on the lock collar 108 is used to retain the slide collar 114 on the lock collar 108. A bearing 118 is mounted on a portion of the slide collar 108. Moreover, a portion of the bearing abuts a step portion of the slide collar 108 such that when the bearing moves axially, the slide collar 114 moves axially. A thrust cap 120 is positioned to engage the bearing 118. Also illustrated in FIG. 3A are fasteners 122 that couple the primary clutch cover 106 to the towers 115a of the movable base 115 of the movable sheave assembly 102a. Hence, the movable base 115, the primary clutch cover 106 and the lock collar 108 are all coupled together and all axially move together on the central post 190.

Figure 3B:
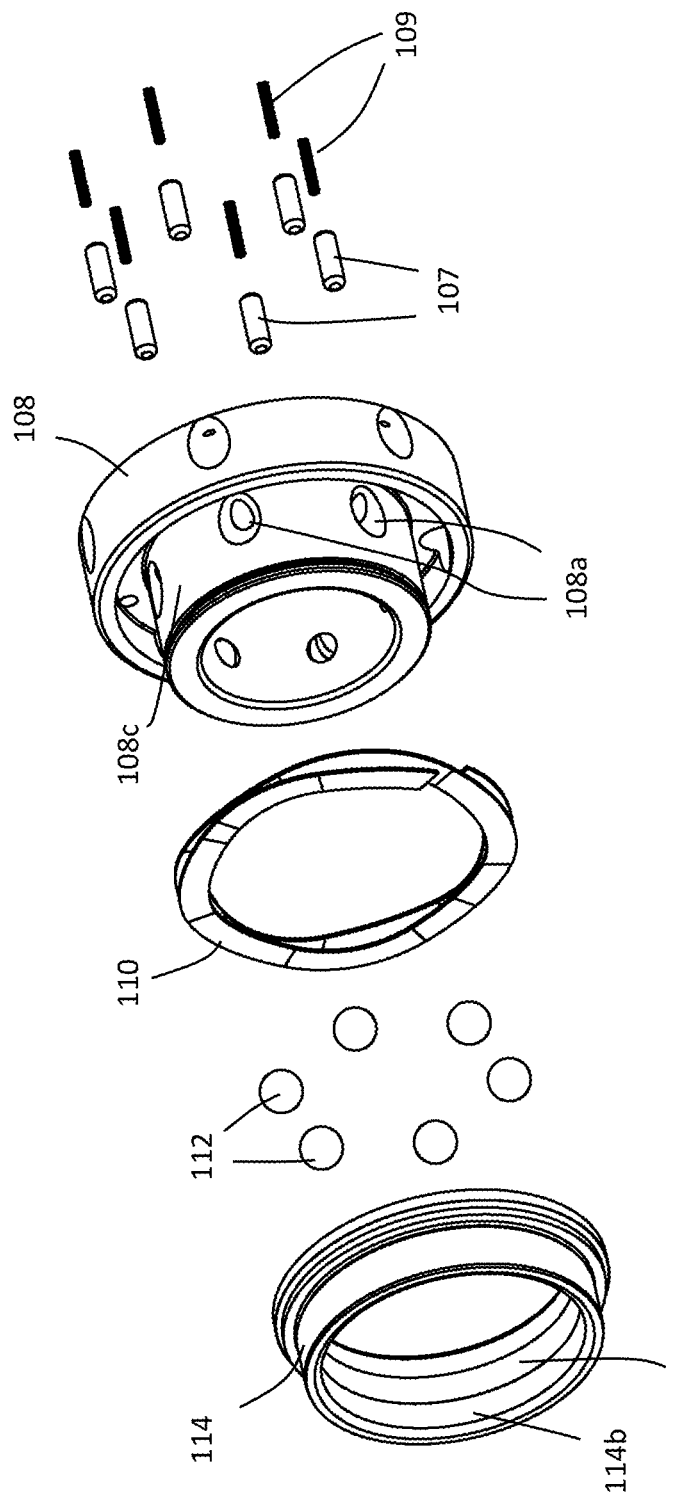
FIG. 3B is a close up side perspective view of part of the components of the launch assist mechanism of according to one exemplary embodiment.

FIG. 3B illustrates a close up side perspective view of part of the components of the launch assist mechanism. In particular, FIG. 3B illustrates the slide collar 114, the locking balls 112, the return biasing member 110, the lock collar 108, the detent bullets 107 and the compression springs 109. As illustrated, slide collar 114 includes an interior surface 114b in which the inner ball retaining groove 114a is formed. As further illustrated, the lock collar 108 includes a plurality of spaced ball pockets 108a. The ball pockets 108a in this embodiment are not perpendicular to an axis of rotation of the primary clutch 102. Further, the ball pockets 108a extend all the way through surfaces of the lock collar 108 such that portions of the locking balls can extend beyond the surfaces of the lock collar 108 to respectfully engage the central post 190 and the interior surface 114b of the slide collar 114 as described below. The return biasing member 110 is received around a first outer surface portion 108c of the lock collar 108 an up against a seat portion formed by the lock collar 108. The locking balls 112 are inserted in the respective ball pockets 108a of the lock collar 108. The slide collar 114 is then positioned on the lock collar 108 so that the interior 114b of the slide collar 114 slidably engages the first outer surface 108c of the lock collar 108. Further each compression springs 109 is received in a cavity (not shown) of an associated detent bullets 107. The detent-compression spring arrangement is received in detent passages 108b (best illustrated in FIG. 5B) as discussed above.

Figure 4A:
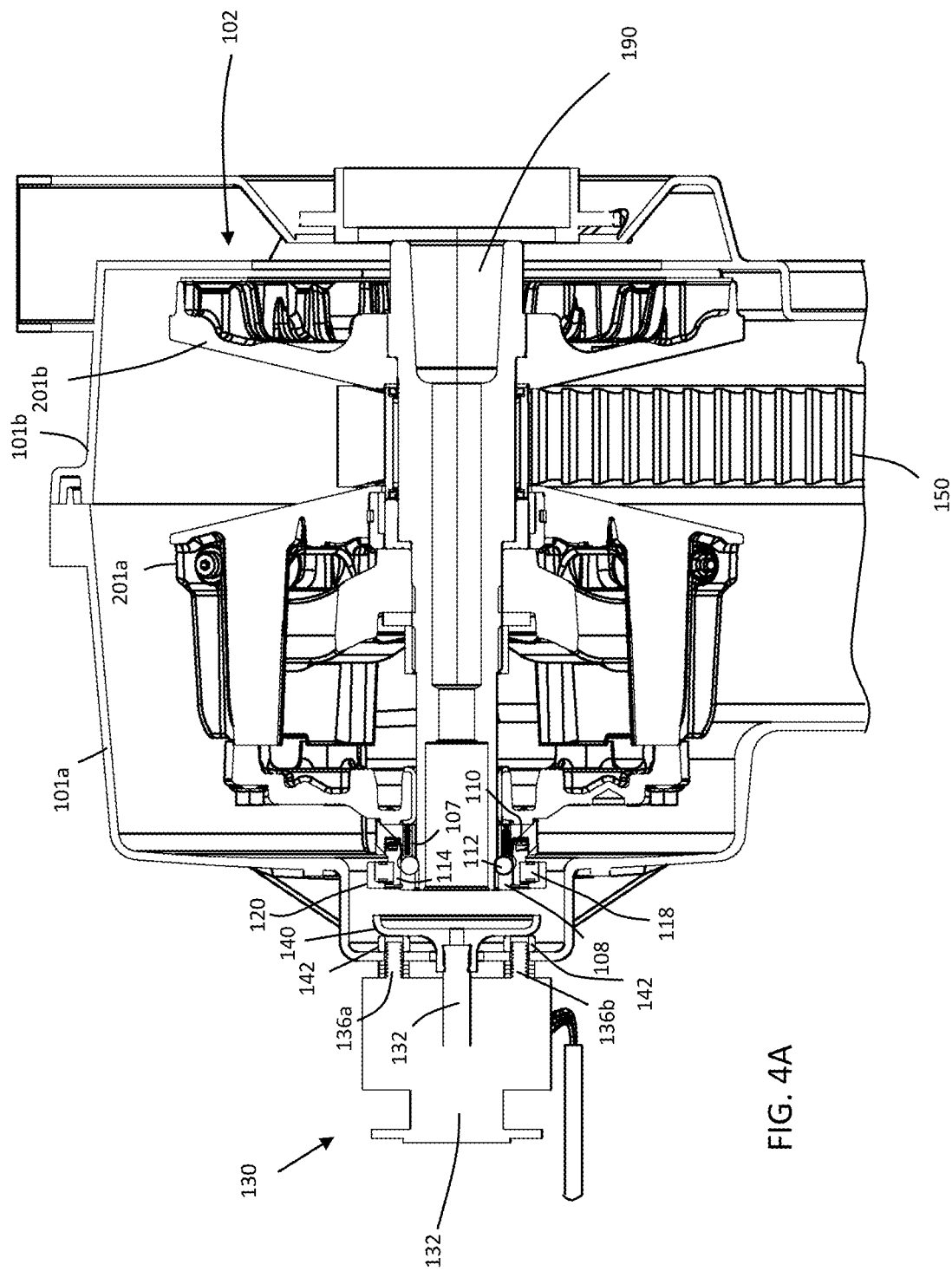
FIG. 4A illustrates a cross-sectional side perspective view of the primary clutch and actuator according to one exemplary embodiment.
Figure 4B:
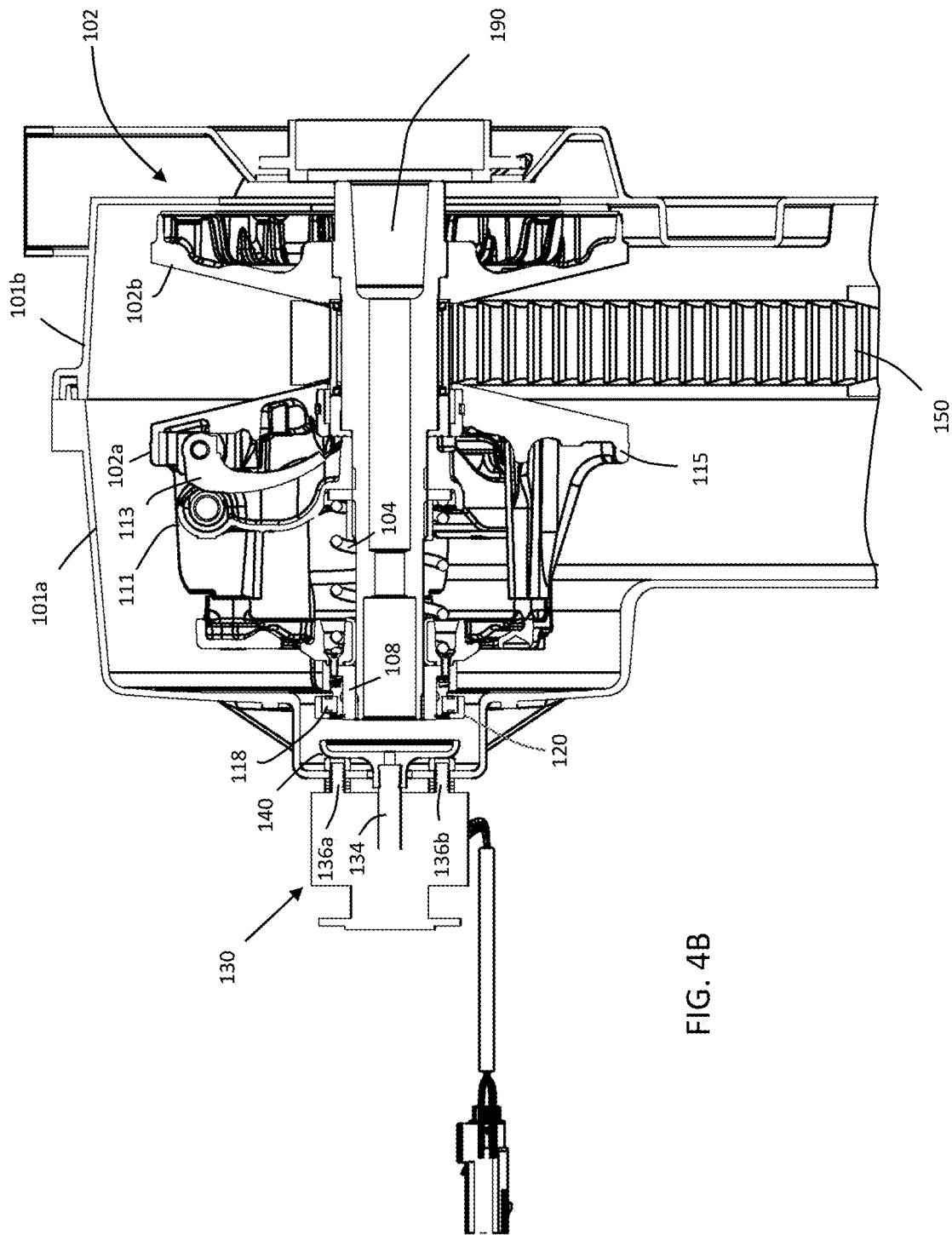
FIG. 4B illustrates another cross-sectional side perspective view of the primary clutch and actuator according to one exemplary embodiment.

FIGS. 4A and 4B illustrate different cross-sectional assembled side views of the movable sheave assembly 102a and the actuator 130. In particular, FIG. 4A illustrates the lock collar-locking ball arrangement and FIG. 4B illustrates the flyweight-spider arrangement. FIG. 5A illustrates a close up cross-sectional side view of the movable sheave assembly 102a and the actuator 130 in a launch assist disabled configuration while the primary clutch 102 is at idle. In this configuration, a first portion of the locking balls 112 engage an interior surface of the slide collar 114 proximate the interior groove 114a of the slide collar 114. A second portion of the locking balls 112 engage the first post portion 191 and ramped step 191a of the central post 190. FIG. 5B illustrates a cross-sectional side perspective view of the primary clutch and actuator with a launch assist disabled and the primary clutch 102 rotating at a RPM that moved the movable sheave system of the movable sheave assembly 102a towards the fixed sheave assembly 102b. As illustrated, in this configuration the first portion of the locking balls 112 are received within the interior groove 114a of the slide collar 114 and the second portion engages the second post portion 193. This configuration allows the locking balls 112 to move up the ramped step 191a to engage the second post portion 193 of the central post 190 as the movable sheave system that includes the primary clutch cover 106 and movable base 115 of the movable sheave assembly 102a move axially along the center post 190 as described above with the flyweights 113 countering the bias force of the main bias member 104 during increased centrifugal force.

Figure 6:
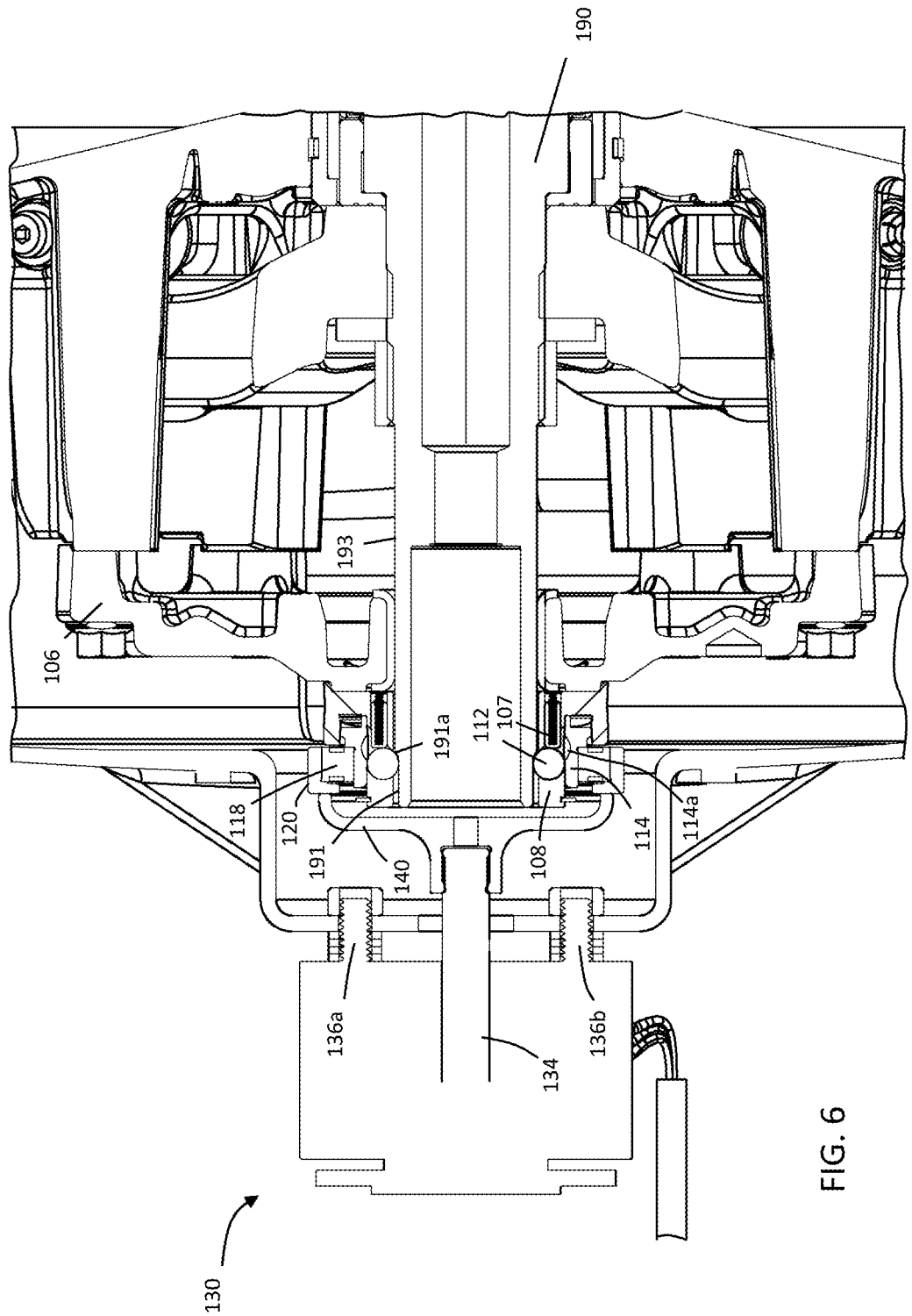
FIG. 6 illustrates a cross-sectional side perspective view of the primary clutch and actuator with the launch assist enabled according to one exemplary embodiment.

FIG. 6 illustrates a close up cross-sectional side view of the movable sheave assembly 102a and the actuator 130 in a launch assist configuration. As discussed above, the launch configuration occurs via activation of a switch or button by the operator of the vehicle. Activation of the actuator 130 causes the activation rod 134 that is attached to the push cap 140, to axially contact and move the thrust cap 120. This in turn axially moves the bearing 118 and the slide collar 114 towards the primary clutch cover 106. As the slide collar 114 moves axially, the locking balls 112 are forced away from the 114a inner ball retaining groove 114a of the slide collar 114. The force of the inner surface of the slide collar on the first portion of the locking balls 112 forcing the second portion of the locking balls into the first post portion 191 and ramped step 191a holds the movable sheave system of the movable sheave assembly 102a in place when the locking mechanism is activated. This prevents the lock collar 108 from axially moving in relation to the central post 190. Since, the lock collar 108 is attached to the primary clutch cover 106 via fasteners 105, the primary clutch cover 106 and movable base 115 are prevented from moving towards the fixed sheave assembly 102b even though the flyweights are asserting a force on the spider 111. Hence, as long as the actuator 130 is activated, an increase in RPMs of the movable sheave assembly 102a will not cause the moveable sheave assembly 102a to move towards the fixed sheave assembly 102b and hence the belt 150 will not be engaged (pinched) to transfer torque to the secondary clutch 160.

Once the desired RPM is reached, the operator disables the launch assistant causing the actuator to retract the activation rod 134. This allows the return biasing member 110 to move the slide collar 114 so that the locking balls 112 align with the inner ball retaining groove 114a of the slide collar 114. This reduces the pressure on the second portion of the locking balls 112 allowing the locking balls 112 to move up the ramped step 191a while the lock collar 108 moves axially on the central post 190 in response to a force created by the flyweight-spider configuration. As discussed above, the flyweights 113 on the spider 111 causes the movable sheave assembly 102a to move towards the fixed sheave assembly 102b to engage the belt 150. Hence, the belt can be engaged at a desired RPM as directed by the operator in embodiments.

In embodiments, the primary clutch 102 is locked from shifting during RPM increase until a desired moment is created by a force of the actuator 130. Although the actuator 103 described above and illustrated in the Figures is an electrical actuator, any type of actuator system can be used including, but not limited to, an electronic solenoid, a hydraulic master/slave piston arrangement and a manual mechanism with the use of a push or pull cable or other like systems. The physical location of the above mentioned devices may be mounted to either an outer or inner CVT housing or surrounding panels of the vehicle to eliminate the need to attach directly to the spinning CVT components. In other embodiments, they are attached directly to the spinning CVT components.

Figure 7:
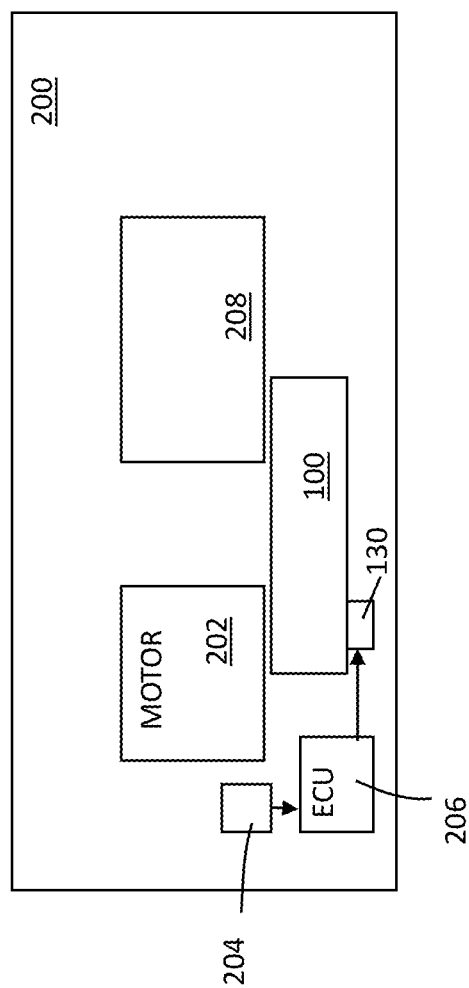
FIG. 7 illustrates a block diagram of a vehicle according to one exemplary embodiment.

One method for setting a maximum RPM limiter for the launch control system is by utilizing an electrical signal from the actuator or other switch indication methods, etc. and incorporating it into a vehicle Electronic Control Unit (ECU) to determine a desired maximum RPM limit. For example, FIG. 7, illustrates a block diagram of vehicle 200 with such a system. In particular, the vehicle 200 includes a motor 202 that supplies torque to the CVT 100. The CVT 100 is in rotational communication with a drivetrain 208 of the vehicle 200. The drivetrain 208 may include, but is not limited to, a further transmission system, one or more drive shafts, one or more differentials, one or more wheels, one or more tracks, etc. The vehicle 200 in this example embodiment further includes an ECU 206 that is in communication with a switch 204. The ECU 206 is further in communication with the actuator 130. As discussed above, in an embodiment the ECU 206 may control the actuator 130 to limit an RPMs of the CVT 100.

In addition, in some embodiments that incorporate different vehicle operating modes, such as, sport mode, stock mode, etc., the ECU 206 of the vehicle 200 may utilize the stock clutch engagement RPM when a stock mode is selected. However, when another mode, such as sport mode is selected, the ECU may automatically employs a higher clutch engagement RPM by activating the launch assist mechanism 130 described above. Hence in this embodiment, the ECU monitors the position of the switch and controls the activation of the activator 130 of the locking mechanism according to a selected switch mode position.

Further another embodiment, an outer groove on the central post 190 may be used instead of the first post portion 191 and ramped step 191a configuration. Moreover, the position of the outer groove or the first post portion 191 and 191a may be placed at different locations on the outer parameter of the central post 190 to lock the CVT into a fixed ratio for other purposes such as for better vehicle fuel mileage, lower operating noise, etc.

Figure 8:
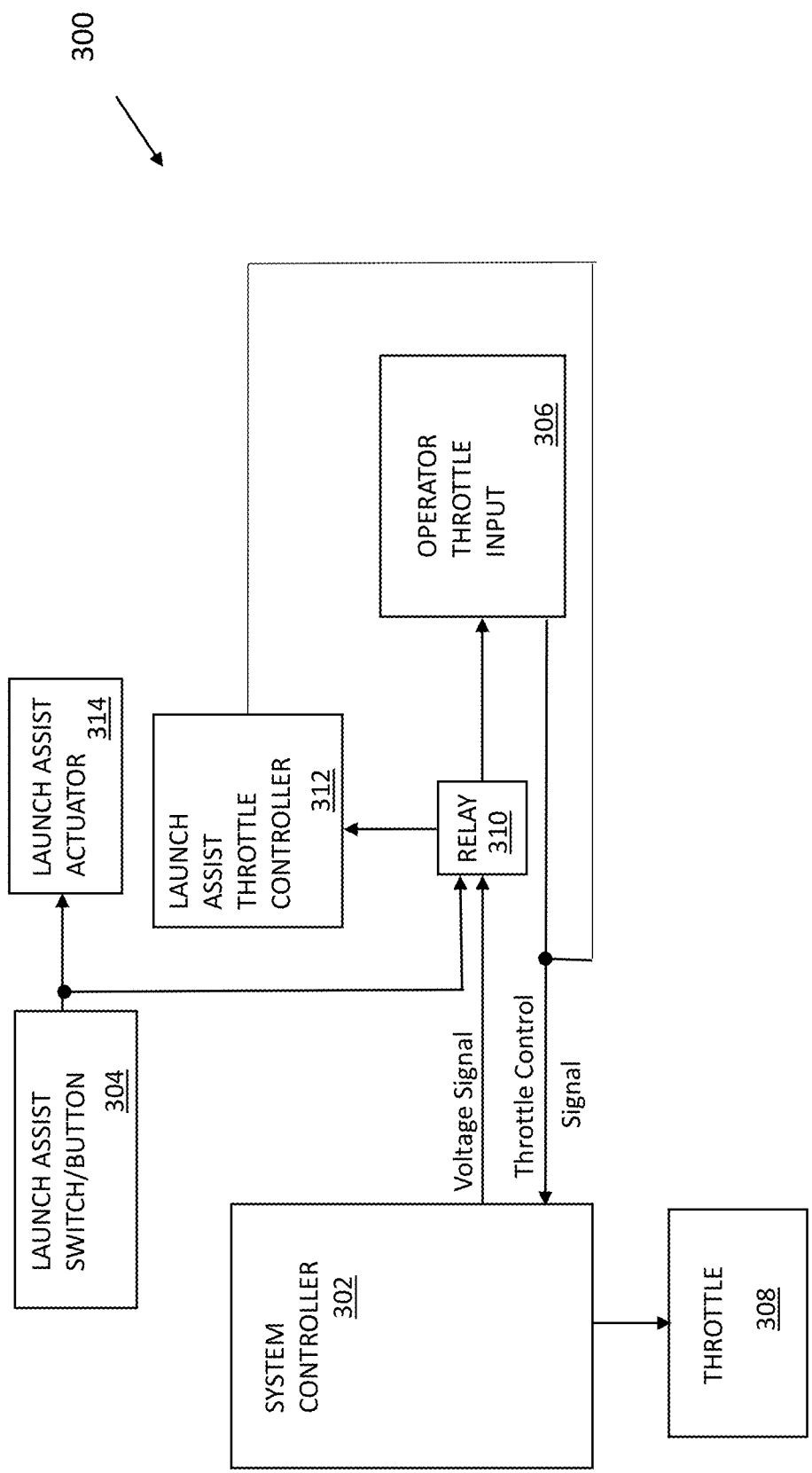
FIG. 8 illustrates a block diagram of a throttle control system according to one exemplary embodiment.

FIG. 8 illustrates a block diagram of a throttle control system 300 according to one exemplary embodiment. This example embodiment include a system controller 302 and a launch assist throttle controller 312. The system controller 302 may be an electronic control module (ECM), an electronic control unit (ECU) or the like. In general, each of the system controller 302 and the launch assist throttle controller 312 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to the controller herein may be embodied as software, firmware, hardware or any combination thereof. The system controller 302 may be part of a system controller (such as the ECU) or a component controller. Each controller 302 and 312 may include memory with computer-readable operating instructions that, when executed by the respective controller 302 or 312 provides functions of the throttle control. The computer readable instructions may be encoded within the memory. The memory may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The system controller 302 in this example embodiment provides a select voltage to an operator throttle input 306. The operator throttle input 306 may be a pedal, lever, turn-able grip or any other type of operator input that adjusts the RPM of the vehicle. In normal operation, the operator throttle input 306 outputs a throttle control signal back to the system controller 320. The throttle control signal is based on an effect of the position of the operator throttle input on the voltage provided by the system controller 302 in this embodiment. The system controller 302, in this normal operation would control the throttle 308 accordingly.

In the embodiment of FIG. 8, when the launch assist switch/button 304 is depressed the launch assist actuator 130 is activated as discussed above. Activation of the launch assist switch/button 304 (or generally a launch assist activation member 304) in this embodiment, also activates (trips) relay 310. When activated, the relay redirects the voltage signal from the system controller 302 to the launch assist throttle controller 312. The launch assist throttle controller 312 then provides the throttle control signal back to the system controller 302 to control the throttle 308 (or throttle body 308). Hence, when the relay 310 is activated, the operator throttle input 306 has no effect on the operation of the throttle 308. The launch assist throttle controller 312 provides a desired throttle control signal for an application. For example, it may be desirable to place the RPM at 100 percent or even above a normal maximum RPM. In embodiment, the operator may select the desired throttle control signal for launch assist. In one embodiment, the launch assist throttle controller 312 is a simple variator that simply takes the voltage signal from the system controller 320 and adjusts it to generate the throttle control signal of a select voltage. The variator 312 may include a dial to selectively adjust the voltage in the throttle control signal.

Once the launch assist switch or button is released or deactivated, the relay 310 returns the routing of the voltage signal from the system controller 302 to the operator throttle input 306 while the launch assist mechanism is applied to launch the vehicle. Hence, normal operations of the operator throttle input 306 is reestablished upon the release or deactivation of the launch assist switch/button 304. Although, only one communication link for each of the voltage signal and the throttle control signal are shown in FIG. 8, a pair of communication links for each signal may be used for redundancy purposes.

An example of a throttle control flow diagram 400 is illustrated in FIG. 9. The throttle control flow diagram 400 is used in an example embodiment to control the RPM provided by the motor 202. The throttle control flow diagram 400 of FIG. 9 is provided as a series of sequential steps. The sequence of steps may occur in a different order in other embodiments. Hence, embodiments are not limited to sequence provided in FIG. 9.

The process of the a throttle control flow diagram 400 of FIG. 9 begins at step (402) where the controller 402 monitors for a launch assist signal (LAS) that is generated by the activation of the launch assist switch/button 304 by the operator of the vehicle. If no LAS is detected at step (404), the controller 302 continues monitoring at step (402). If an LAS is detected at step (404), the launch assist (LA) is engaged at step (406). As discussed above, the LA assist implements the locking mechanism to selectively prevent movement of the movable sheave system independent of the RPM the primary clutch 102 is experiencing. The RPM provided by the motor 202 is then increased independent of the throttle input provided by the operator at step (408). It step (410) it is determined if a complete launch assist signal has been received. In one embodiment, this signal is generated once the switch/button 304 is switched/released. If it is determined a complete launch assist signal has not been received (i.e. the switch/button 304 is still activated) at step (410), the RPM continue to increase at step (408). Embodiments employ a governor that will limit the maximum RPM to a select value. Once the RPM has reached 100 percent of the maximum select value (or another select value), the RPM will not increase any farther.

Once it is determined a complete launch assist signal is received (i.e. the switch/button 304 is no longer activated) at step (410), the LA is released at step (412) and the throttle control is returned to the throttle input provided by the operator at step (414). The process then continues at step (402) monitoring for another LAS signal.

Hence, in the example embodiment of FIG. 9, a method is provided to increase the RPM independent of the operators throttle position during launch assist operations to ensure a benefit of the launch assist. For example, if the launch assist mechanism is activated while the throttle is held by the operator at only 30 percent of the maximum RPM allowed, the benefit of the launch assist will not be fully realized. Independently of operator throttle position (the operator throttle input) the method increases the RPM to a select value. Since, the operator throttle input is disconnected during the launch assist, even if the operator manipulates the operator throttle input to 100 percent it will have no effect on the RPM. As discussed, the system increases the RPM to a select value independent of the operator throttle position during launch assist so the full benefit of the launch assist mechanism is realized when the switch/button is released (i.e. deactivated).

Example Embodiments

Example 1 is a primary clutch of a continuously variable transmission with a launch assist mechanism. The primary clutch includes a central post, a fixed sheave assembly, a movable sheave assembly and a locking mechanism. The central post is configured to receive rotational torque from a motor. The fixed sheave assembly is statically mounted on the central post. The movable sheave assembly is mounted on the central post. The movable sheave assembly includes a movable sheave system that is configured to move axially on the central post towards the fixed sheave assembly as RPM of the primary clutch increase. The locking mechanism is configured and arranged to selectively prevent movement of the movable sheave system independent of the RPM of the primary clutch.

Example 2, includes the primary clutch of Example 1, wherein the movable sheave assembly includes a spider statically mounted to the central post and the movable sheave system of the movable sheave assembly includes a movable base, a primary clutch cover, a main biasing member and at least one flyweight. The primary clutch cover is coupled to the movable base. The main biasing member is positioned to assert a main biasing force to distance the primary clutch cover from the spider. The at least one flyweight an main biasing member forming a flyweight-main biasing member configuration to selectively move at least portion of the movable sheave assembly axially on the central post. The at least one flyweight is pivotally coupled to the movable base. The at least one flyweight is configured and arranged to engage the spider as the RPM of the primary clutch increase to assert a force that counters the main biasing force of the main biasing member to move the primary clutch cover and movable base axially towards the fixed sheave assembly along the central post.

Example 3 includes the primary clutch of any of the Examples 1-2, wherein the locking mechanism further includes a locking collar, a plurality of locking balls, a slide collar and an actuator. The lock collar is mounted around a portion of the central post. The lock collar has a plurality of ball pockets. Each locking ball is received in an associated ball pocket of the plurality of ball pockets of the lock collar. The slide collar is received around a portion of the lock collar. The slide collar has an inner ball retaining groove. Each locking ball of the plurality of locking balls has a first portion selectively received within the inner retaining groove. The actuator is configured to axially move the slide collar when activated to force the first portion of each locking ball out of the inner retaining groove of the slide collar and force a second portion of each locking ball into at least a ramped step on an outer surface of the central post to selectively prevent axial movement of the lock collar in relation to the central post.

Example 4 includes the primary clutch of Example 3, wherein the locking mechanism further includes a return biasing member positioned to bias the slide collar so the first portion of each locking ball is received within the inner retaining groove of the slide collar when the actuator is not activated and the movable sheave system is moving axially on the center post.

Example 5 includes the primary clutch of any of the Examples 3-4, wherein the locking mechanism further includes a bearing, a thrust cap and a push cap. The bearing engages a portion of the slide collar. The thrust cap engages a portion of the bearing. The push cap engages an activation rod of the actuator. The thrust cap is further configured to engage the thrust cap when the actuator is activated.

Example 6 includes the primary clutch of any of the Examples 1-5, wherein the locking mechanism further includes a user activated switch to selectively activate the locking mechanism.

Example 7 includes the primary clutch of any of the Examples 1-6, wherein the locking mechanism further includes a vehicle electronic unit configured to at least one of set a maximum RPM launch control for the locking mechanism and control activation of the locking mechanism according to a selected switch mode position.

Example 8 is a primary clutch of a continuously variable transmission with a launch assist mechanism. The primary clutch includes a central post, a fixed sheave assembly and a movable sheave assembly. The central post is configured to receive rotational torque from a motor. The fixed sheave assembly is statically mounted on the central post. The movable sheave assembly is mounted on the central post. The movable sheave assembly includes a spider, a movable base, a primary clutch cover, a main biasing member and at least one flyweight. The spider is statically mounted to the central post. The primary clutch cover is coupled to the movable base. The main biasing member is positioned to assert a main biasing force to distance the primary clutch cover from the spider. Moreover, the least one flyweight forms a flyweight-main biasing member configuration to selectively move at least portion of the movable sheave assembly axially on the central post. The at least one flyweight pivotally coupled to the movable base. The at least one flyweight configured and arranged to engage the spider as RPM of the primary clutch increases to assert a force that counters the main biasing force of the main biasing member to move the primary clutch cover and movable base axially towards the fixed sheave assembly along the central post. Further a locking mechanism is included that is configured and arranged to selectively prevent movement of the primary clutch cover and movable base independent of the flyweight-main biasing member configuration.

Example 9 includes the primary clutch of Example 8, wherein the locking mechanism further includes a lock collar, a plurality of locking balls, a slide collar and an actuator. The lock collar is mounted around a portion of the central post. The lock collar has a plurality of ball pockets. Each locking ball is received in an associated ball pocket of the plurality of ball pockets of the lock collar. The slide collar is received around a portion of the lock collar. The slide collar has an inner ball retaining groove. Each locking ball of the plurality of locking balls have a first portion that is selectively received within the inner retaining groove. The actuator is configured to axially move the slide collar when activated to force the first portion of each locking ball out of the inner retaining groove of the slide collar and force a second portion of each locking ball into at least a ramped step on an outer surface of the central post to selectively prevent axial movement of the lock collar in relation to the central post.

Example 10 includes the primary clutch the Example 9, wherein the locking mechanism further includes a return biasing member positioned to bias the slide collar so the first portion of each locking ball is received within the inner retaining groove of the slide collar when the actuator is not activated.

Example 11 includes the primary clutch of any of the Examples 9-10, wherein the locking mechanism further includes a bearing, a thrust cap and a push cap. The bearing engages a portion of the slide collar. The thrust cap engages a portion of the bearing. The push cap engages an activation rod of the actuator. The thrust cap is further configured to engage the thrust cap when the actuator is activated.

Example 12 includes the primary clutch of any of the Examples 8-11, wherein the locking mechanism further includes a user activated switch to selectively activate the locking mechanism.

Example 13 includes the primary clutch of any of the Examples 8-12, wherein the locking mechanism further includes a vehicle electronic unit configured to at least one of set a maximum RPM launch control for the locking mechanism and control activation of the locking mechanism according to a selected switch mode position.

Example 14 includes the primary clutch of any of the Examples 9-13, wherein the lock collar is coupled to the primary clutch cover of the movable sheave assembly.

Example 15 is a vehicle with a launch assist mechanism. The vehicle includes an engine to generate torque, a continuously variable transmission and drive train. The continuously variable transmission includes a primary clutch and a secondary clutch. The secondary clutch is rotationally coupled to the primary clutch via endless looped belt. The primary clutch includes a central post, a fixed sheave assembly, a movable sheave assembly and a locking mechanism. The central post is configured to receive rotational torque from the motor. The fixed sheave assembly is statically mounted on the central post. The movable sheave assembly is mounted on the central post. The movable sheave assembly includes a movable sheave system that is configured to move axially on the central post towards the fixed sheave assembly as RPM of the primary clutch increases. The locking mechanism is configured and arranged to selectively prevent movement of the movable sheave system independent of RPM of the primary clutch. The drive train is coupled to the secondary clutch.

Example 16 includes the vehicle of Example 15, wherein the locking mechanism further includes a lock collar, a plurality of locking balls, a slide collar, an actuator and a return biasing member. The lock collar is mounted a portion of the central post. The lock collar has a plurality of ball pockets. Each locking ball is received in an associated ball pocket of the plurality of ball pockets of the lock collar. The slide collar is received around a portion of the lock collar. The slide collar has an inner ball retaining groove. Each locking ball of the plurality of locking balls have a first portion that is selectively received within the inner retaining groove. The actuator is configured to axially move the slide collar when activated to force the first portion of each locking ball out of the inner retaining groove of the slide collar and force a second portion of each locking ball into at least a ramped step on an outer surface of the central post to selectively prevent axial movement of the lock collar in relation to the central post. The return biasing member is positioned to bias the slide collar so the first portion of each locking ball is received within the inner retaining groove of the slide collar when the actuator is not activated.

Example 17 includes the vehicle of Example 16, wherein the locking mechanism further includes a bearing, a thrust cap and a push cap. The bearing engages a portion of the slide collar. The thrust cap engages a portion of the bearing and the push cap engages an activation rod of the actuator. The thrust cap is further configured to engage the thrust cap when the actuator is activated.

Example 18 includes the vehicle of any of the Examples 15-17, wherein the locking mechanism further includes a user activated switch in communication with the actuator to selectively activate the actuator.

Example 19 includes the vehicle of any of the Examples 15-18, wherein the locking mechanism further includes a vehicle electronic unit configured to at least one of set a maximum RPM launch control for the locking mechanism and control activation of the locking mechanism according to a selected switch mode position.

Example 20 includes the vehicle of any of the Examples 15-19, further including a launch assist activation member, a throttle, an operator throttle input, a system controller and a launch assist. The launch assist activation member is used to selectively activate the locking mechanism. The throttle is used to control the RPM of the engine. The operator throttle input is used to provide operator input on a desired RPM of the engine. The system controller is in communication with the operator throttle input. The system controller is further configured to control operation of the throttle based at least in part on a throttle control signal from the operator throttle input. The launch assist throttle controller system is coupled to generate a substitute throttle control signal used by the system controller that is independent of the throttle control signal provided by the operator throttle input when the launch assist activation member is activated.

Example 21 is a method of operating a continuously variable transmission (CVT) with a launch assist mechanism. The method includes receiving a launch assist signal; engaging a locking mechanism configured and arranged to selectively prevent movement of a movable sheave system independent of an RPM of a primary clutch of the CVT; increasing the RPM of the primary clutch independent of an operator throttle control; and upon receiving a complete launch assist signal, releasing the locking mechanism and returning throttle control to the operator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A primary clutch of a continuously variable transmission with a launch assist mechanism, the primary clutch comprising:
   a central post configured to receive rotational torque from a motor;
   a fixed sheave assembly statically mounted on the central post;
   a movable sheave assembly mounted on the central post, the movable sheave assembly including a movable sheave system that is configured to move axially on the central post towards the fixed sheave assembly as revolutions per minute (RPM) of the primary clutch increases; and
   a locking mechanism configured and arranged to selectively prevent movement of the movable sheave system independent of the RPM of the primary clutch, wherein the locking mechanism includes,
      a lock collar mounted around a portion of the central post, the lock collar having a plurality of ball pockets,
      a plurality of locking balls, each locking ball received in an associated ball pocket of the plurality of ball pockets of the lock collar,
      a slide collar received around a portion of the lock collar, the slide collar having an inner ball retaining groove, each locking ball of the plurality of locking balls having a first portion selectively received within the inner retaining groove, and
      an actuator configured to axially move the slide collar when activated to force the first portion of each locking ball out of the inner retaining groove of the slide collar and force a second portion of each locking ball into at least a ramped step on an outer surface of the central post to selectively prevent axial movement of the lock collar in relation to the central post.

2. The primary clutch of claim 1, further wherein:
the movable sheave assembly includes a spider statically mounted to the central post; and
the movable sheave system of the movable sheave assembly includes,
   a movable base,
   a primary clutch cover coupled to the movable base,
   a main biasing member positioned to assert a main biasing force to distance the primary clutch cover from the spider, and
   at least one flyweight, the at least one flyweight and main biasing member forming a flyweight-main biasing member configuration to selectively move at least portion of the movable sheave assembly axially on the central post, the at least one flyweight pivotally coupled to the movable base, the at least one flyweight configured and arranged to engage the spider as the RPM of the primary clutch increase to assert a force that counters the main biasing force of the main biasing member to move the primary clutch cover and movable base axially towards the fixed sheave assembly along the central post.

3. The primary clutch of claim 1, wherein the locking mechanism further comprises:
   a return biasing member positioned to bias the slide collar so the first portion of each locking ball is received within the inner retaining groove of the slide collar when the actuator is not activated and the movable sheave system is moving axially on the central post.

4. The primary clutch of claim 1, wherein the locking mechanism further comprises:
   a bearing engaging a portion of the slide collar;
   a thrust cap engaging a portion of the bearing; and
   a push cap engaging an activation rod of the actuator, the thrust cap further configured to engage the thrust cap when the actuator is activated.

5. The primary clutch of claim 1, wherein the locking mechanism further comprises:
   a user activated switch to selectively activate the locking mechanism.

6. The primary clutch of claim 1, wherein the locking mechanism further comprises:
   a vehicle electronic unit configured to at least one of set a maximum RPM launch control for the locking mechanism and control activation of the locking mechanism according to a selected switch mode position.

7. A primary clutch of a continuously variable transmission with a launch assist mechanism, the primary clutch comprising:

a central post configured to receive rotational torque from a motor;
a fixed sheave assembly statically mounted on the central post;
a movable sheave assembly mounted on the central post, the movable sheave assembly including,
a spider statically mounted to the central post,
a movable base,
a primary clutch cover coupled to the movable base,
a main biasing member positioned to assert a main biasing force to distance the primary clutch cover from the spider, and
at least one flyweight forming a flyweight-main biasing member configuration to selectively move at least portion of the movable sheave assembly axially on the central post, the at least one flyweight pivotally coupled to the movable base, the at least one flyweight configured and arranged to engage the spider as revolutions per minute (RPM) of the primary clutch increases to assert a force that counters the main biasing force of the main biasing member to move the primary clutch cover and movable base axially towards the fixed sheave assembly along the central post; and
a locking mechanism configured and arranged to selectively prevent movement of the primary clutch cover and movable base independent of the flyweight-main biasing member configuration, wherein the locking mechanism further includes,
a lock collar mounted around a portion of the central post, the lock collar having a plurality of ball pockets,
a plurality of locking balls, each locking ball received in an associated ball pocket of the plurality of ball pockets of the lock collar,
a slide collar received around a portion of the lock collar, the slide collar having an inner ball retaining groove, each locking ball of the plurality of locking balls having a first portion selectively received within the inner retaining groove, and
an actuator configured to axially move the slide collar when activated to force the first portion of each locking ball out of the inner retaining groove of the slide collar and force a second portion of each locking ball into at least a ramped step on an outer surface of the central post to selectively prevent axial movement of the lock collar in relation to the central post.

8. The primary clutch of claim 7, wherein the locking mechanism further comprises:
a return biasing member positioned to bias the slide collar so the first portion of each locking ball is received within the inner retaining groove of the slide collar when the actuator is not activated.

9. The primary clutch of claim 7, wherein the locking mechanism further comprises:
a bearing engaging a portion of the slide collar;
a thrust cap engaging a portion of the bearing; and
a push cap engaging an activation rod of the actuator, the thrust cap further configured to engage the thrust cap when the actuator is activated.

10. The primary clutch of claim 7, wherein the locking mechanism further comprises:
a user activated switch to selectively activate the locking mechanism.

11. The primary clutch of claim 7, wherein the locking mechanism further comprises:

a vehicle electronic unit configured to at least one of set a maximum RPM launch control for the locking mechanism and control activation of the locking mechanism according to a selected switch mode position.

12. The primary clutch of claim 7, wherein the lock collar is coupled to the primary clutch cover of the movable sheave assembly.

13. A vehicle with a launch assist mechanism, the vehicle comprising:
an engine to generate torque;
a continuously variable transmission including a primary clutch and a secondary clutch, the secondary clutch rotationally coupled to the primary clutch via endless looped belt, the primary clutch including,
a central post coupled to receive rotational torque from a motor;
a fixed sheave assembly statically mounted on the central post,
a movable sheave assembly mounted on the central post, the movable sheave assembly including a movable sheave system that is configured to move axially on the central post towards the fixed sheave assembly as revolutions per minute (RPM) of the primary clutch increases, and
a locking mechanism configured and arranged to selectively prevent movement of the movable sheave system independent of RPM of the primary clutch; and
a drive train coupled to the secondary clutch, wherein the locking mechanism further includes,
a lock collar mounted around a portion of the central post, the lock collar having a plurality of ball pockets,
a plurality of locking balls, each locking ball received in an associated ball pocket of the plurality of ball pockets of the lock collar,
a slide collar received around a portion of the lock collar, the slide collar having an inner ball retaining groove, each locking ball of the plurality of locking balls having a first portion selectively received within the inner retaining groove,
an actuator configured to axially move the slide collar when activated to force the first portion of each locking ball out of the inner retaining groove of the slide collar and force a second portion of each locking ball into at least a ramped step on an outer surface of the central post to selectively prevent axial movement of the lock collar in relation to the central post, and
a return biasing member positioned to bias the slide collar so the first portion of each locking ball is received within the inner retaining groove of the slide collar when the actuator is not activated.

14. The vehicle of claim 13, wherein the locking mechanism further comprises:
a bearing engaging a portion of the slide collar;
a thrust cap engaging a portion of the bearing; and
a push cap engaging an activation rod of the actuator, the thrust cap further configured to engage the thrust cap when the actuator is activated.

15. The vehicle of claim 13, wherein the locking mechanism further comprises:
a user activated switch in communication with the actuator to selectively activate the actuator.

16. The vehicle of claim 13, wherein the locking mechanism further comprises:

a vehicle electronic unit configured to at least one of set a maximum RPM launch control for the locking mechanism and control activation of the locking mechanism according to a selected switch mode position.

17. The vehicle of claim 13, further comprising:
a launch assist activation member to selectively activate the locking mechanism;
a throttle to control the RPM of the engine;
an operator throttle input to provide operator input on a desired RPM of the engine;
a system controller in communication with the operator throttle input, the system controller further configured to control operation of the throttle based at least in part on a throttle control signal from the operator throttle input; and
a launch assist throttle controller system coupled to generate a substitute throttle control signal used by the system controller that is independent of the throttle control signal provided by the operator throttle input when the launch assist activation member is activated.

* * * * *